US012589043B1

(12) United States Patent
Hamilton

(10) Patent No.: US 12,589,043 B1
(45) Date of Patent: Mar. 31, 2026

(54) HOSPITAL BED WITH USB CHARGING PORTS

(71) Applicant: Cherylene Hamilton, Bradenton, FL (US)

(72) Inventor: Cherylene Hamilton, Bradenton, FL (US)

( * ) Notice: Subject to any disclaimer, the term of this patent is extended or adjusted under 35 U.S.C. 154(b) by 10 days.

(21) Appl. No.: 18/753,019

(22) Filed: Jun. 25, 2024

(51) Int. Cl.
*A61G 7/05* (2006.01)
*H02J 7/00* (2006.01)

(52) U.S. Cl.
CPC .......... *A61G 7/0509* (2016.11); *H02J 7/0042* (2013.01)

(58) Field of Classification Search
CPC ...... A61G 7/05; A61G 7/0507; A61G 7/0509; A61G 7/0524; H02J 7/0042
USPC ........................................ 5/428, 503.1, 600
See application file for complete search history.

(56) References Cited

U.S. PATENT DOCUMENTS

| | | | | |
|---|---|---|---|---|
| 7,874,410 | B2 * | 1/2011 | Fulbrook ............ | A61M 5/1415 |
| | | | | 361/111 |
| 7,967,137 | B2 | 6/2011 | Fulbrook et al. | |
| 8,143,846 | B2 * | 3/2012 | Herman ............... | A61G 7/0514 |
| | | | | 320/108 |
| 8,347,433 | B1 * | 1/2013 | Shih ..................... | A47C 20/041 |
| | | | | 5/613 |
| 9,375,374 | B2 * | 6/2016 | Herman ............... | A61G 7/0514 |
| 10,013,868 | B2 * | 7/2018 | Cox ..................... | G16H 40/67 |
| 10,342,358 | B1 * | 7/2019 | Palashewski ........ | A47C 27/083 |
| 10,940,068 | B2 * | 3/2021 | Patmore ............... | A61G 7/0509 |
| 10,980,689 | B2 * | 4/2021 | Bhimavarapu ...... | A61G 7/0527 |

| | | | | |
|---|---|---|---|---|
| 2011/0247137 | A1 * | 10/2011 | Herman ................. | A61G 7/018 |
| | | | | 5/503.1 |
| 2013/0264851 | A1 * | 10/2013 | Kim ....................... | B60N 2/879 |
| | | | | 297/217.3 |
| 2015/0186611 | A1 | 7/2015 | George et al. | |
| 2016/0008197 | A1 * | 1/2016 | Zerhusen ............. | A61G 7/0533 |
| | | | | 5/503.1 |
| 2016/0097525 | A1 * | 4/2016 | Chien ...................... | H02J 7/00 |
| | | | | 362/135 |
| 2017/0319412 | A1 * | 11/2017 | Herman ............... | A61G 7/0514 |
| 2018/0333317 | A1 * | 11/2018 | Zerhusen ........... | H01R 13/7135 |
| 2019/0015276 | A1 * | 1/2019 | Bhimavarapu ....... | H02J 7/0042 |
| 2019/0099007 | A1 * | 4/2019 | Ribble ................... | A61G 7/015 |
| 2020/0076351 | A1 * | 3/2020 | Belverio ............. | A47B 23/001 |
| 2020/0153259 | A1 * | 5/2020 | Bober ...................... | H02J 7/02 |

(Continued)

FOREIGN PATENT DOCUMENTS

TR          201806364 U5 *   6/2018

OTHER PUBLICATIONS

Machine Translation of TR-201806364-U5.*

*Primary Examiner* — David R Hare
(74) *Attorney, Agent, or Firm* — Sanchelima & Associates, P.A.; Jesus Sanchelima; Christian Sanchelima

(57) ABSTRACT

The present invention describes a hospital bed equipped with USB charging ports. The bed includes an adjustable patient support structure with side rails. A pair of USB charging ports is disposed in one of the side rails, each port having a removable cover assembly. This arrangement allows a patient to conveniently charge their electronic devices without needing to leave their bed. The USB charging ports are designed to keep the patient's electronic devices fully charged during their stay, enhancing their comfort and convenience. The design is cost-effective and can be easily implemented in various types of patient support furniture.

5 Claims, 4 Drawing Sheets

(56) References Cited

U.S. PATENT DOCUMENTS

2021/0145152 A1* 5/2021 Rey ........................ A45D 44/02
2021/0330526 A1* 10/2021 Kennedy .............. A61G 7/0503
2022/0362080 A1* 11/2022 McCorquodale .... A61G 7/0507

* cited by examiner

HOSPITAL BED WITH USB CHARGING PORTS

BACKGROUND OF THE INVENTION

1. Field of the Invention

The present disclosure relates to patient support furniture, and, more particularly, to a hospital bed equipped with integrated USB charging ports for convenient charging of electronic devices. This technology enhances patient comfort and convenience by allowing for the charging of devices without the patient needing to leave the bed.

2. Description of the Related Art

BACKGROUND

Several designs for patient support furniture, particularly hospital beds, have been designed in the past. These designs have focused on improving patient comfort, convenience, and safety. Some of these designs have incorporated features such as adjustable bed structures, side rails, and even some electronic features. However, none of them include a hospital bed equipped with integrated USB charging ports, allowing patients to conveniently charge their electronic devices without needing to leave their bed. This innovative feature enhances patient comfort and convenience by keeping their electronic devices fully charged during their stay, thereby reducing the inconvenience of having to leave the bed to charge devices and catering to those who are unable to move around.

Other documents describing the closest subject matter provide for a number of more or less complicated features that fail to solve the problem in an efficient and economical way. None of these patents suggest the novel features of the present disclosure. For instance, U.S. Pat. No. 7,967,137-B2 discloses an organizer tray apparatus for medical patients that includes a tray with various recesses for holding medical supplies and power embodiments with multiple electrical outlets, including USB ports, for powering and charging electronic devices. However, this prior art does not integrate USB charging ports directly into the structure of a hospital bed, particularly within the side rails, as in the present disclosure. The present disclosure provides a hospital bed with USB charging ports that are seamlessly integrated into the side rails, with a removable cover assembly for protection, and designed to be resistant to various forms of damage, thereby offering a more streamlined and patient-centric solution for charging electronic devices conveniently at the bedside.

US-2015/0186611-A1 discloses a patient support with data communication capabilities, including a control circuit with a controller, memory, communication interface, and processor, designed to output data securely using an encryption key. The present disclosure, in contrast, focuses on the physical integration of USB charging ports into the structure of a hospital bed, specifically within the side rails, to enhance patient comfort by providing convenient access to charging facilities. Unlike the prior art, which centers on secure data communication, the current innovation emphasizes the practical utility of charging ports for electronic devices, complete with protective cover assemblies and resistance to environmental damage, thereby offering a direct, patient-centric charging solution.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a hospital bed equipped with USB charging ports, enabling patients to conveniently charge their electronic devices without needing to leave their bed.

It is a further object of this present invention to provide a hospital bed with a built-in USB outlet that is easily accessible to patients, thereby enhancing their comfort and convenience during their hospital stay.

It is still another object of the present invention to provide a USB outlet integrated into a hospital bed, designed to keep patients' electronic devices fully charged during their stay. This feature not just ensures the convenience of not having to leave the bed to charge devices, but also caters to those who are unable to move around. The design is cost-effective and can be easily implemented in various types of patient support furniture.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRA WINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The present disclosure provides a hospital bed equipped with USB charging ports. This hospital bed is designed to enhance the convenience and comfort of patients during their stay in a healthcare facility. The main components of this hospital bed include an adjustable patient support bed with side rails and a pair of USB charging ports. The USB charging ports are integrated into one of the side rails and are covered by a removable cover assembly. This design allows patients to charge their mobile devices, such as phones, tablets, and laptops, without having to leave their bed. This feature may be particularly beneficial for patients who are unable to move around freely or who wish to keep their devices within easy reach. The integration of USB charging ports into the hospital bed may provide patients with continuous access to their electronic devices, potentially reducing boredom and enabling constant communication with their loved ones or healthcare providers.

Figure 1:
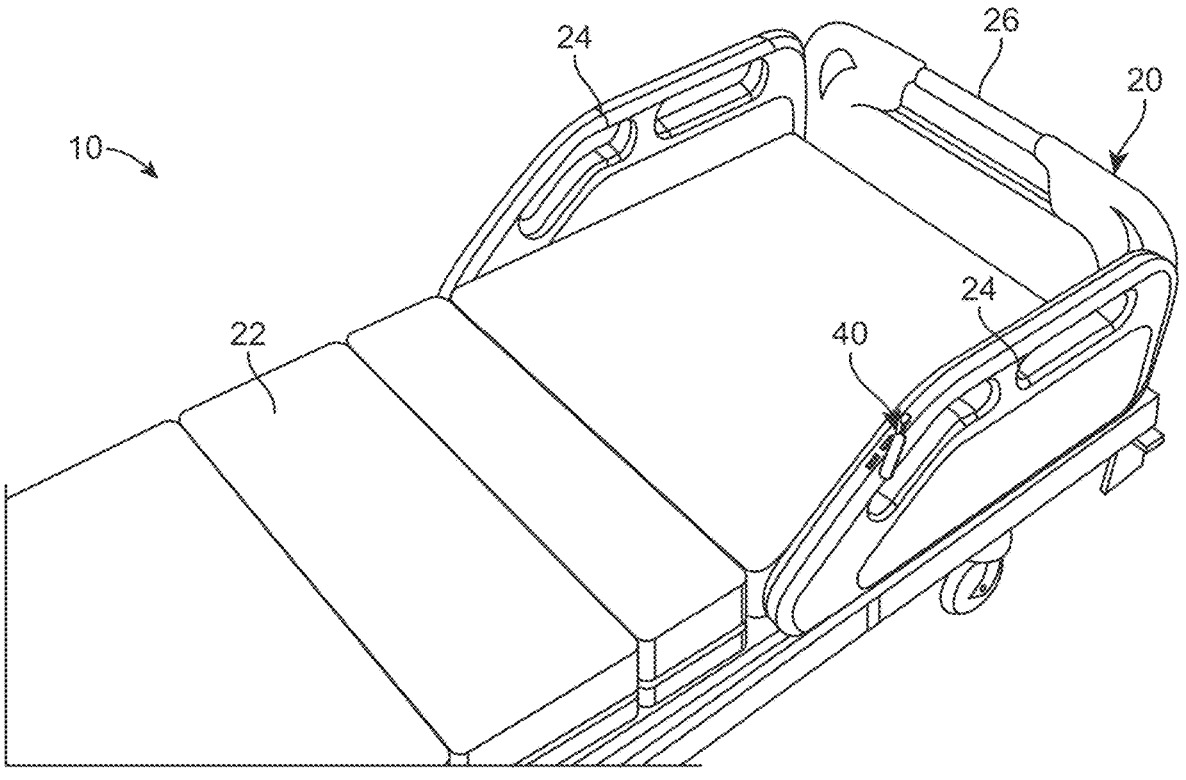
FIG. 1 illustrates an isometric view of a hospital bed with integrated USB charging port, according to aspects of the present disclosure.

Referring to FIG. 1, an isometric view of a hospital bed 10 is depicted. The hospital bed 10 may include a headboard 20 and a footboard 26, with a mattress 22 positioned between them. In some aspects, side rails 24 are located on both sides of the hospital bed 10, providing support and safety for the patient.

In some cases, a USB charging port 40 is integrated into one of the side rails 24, allowing for convenient charging of electronic devices. This arrangement may ensure that patients can easily access the USB charging port 40 without needing to leave the bed. In some aspects, the USB charging port 40 is embedded within the side rail 24, providing easy access for patients to charge their electronic devices.

In some cases, the USB charging port 40 is positioned in such a way that it is easily accessible to the patient lying on the mattress 22. This positioning may allow the patient to charge their electronic devices without having to leave the comfort of the hospital bed 10.

In some aspects, the USB charging port 40 is designed to be robust and durable, capable of withstanding repeated use over a long period of time. This may be particularly beneficial in a hospital setting, where the bed 10 and its components may be subject to frequent use and wear.

In some cases, the USB charging port 40 is designed to provide a sufficient amount of power to charge a variety of electronic devices, such as smartphones, tablets, and laptops. This may allow patients to keep their devices fully charged during their stay in the hospital, enhancing their comfort and convenience.

In some aspects, the USB charging port 40 is covered by a removable cover when not in use, protecting it from dust and other potential contaminants. This may help to maintain the functionality and longevity of the USB charging port 40.

In some cases, the USB charging port 40 is designed to be easily cleaned and sanitized, which may be particularly beneficial in a hospital setting where cleanliness and hygiene are of utmost priority.

In some aspects, the USB charging port 40 is designed to be easily serviced or replaced if it becomes damaged or non-functional. This may allow for the continued use of the hospital bed 10 without the inconvenience of having to replace the whole side rail 24.

In some cases, the USB charging port 40 is designed to be compatible with a variety of USB cables, allowing patients to use their own charging cables to charge their devices. This may enhance the convenience and usability of the hospital bed 10.

In some aspects, the USB charging port 40 is designed to be user-friendly, with clear markings indicating its function and how to use it. This may make it easier for patients to use the USB charging port 40, particularly those who may be unfamiliar with such technology.

In some cases, the USB charging port 40 is designed to be discreetly integrated into the side rail 24, blending in with the overall design of the hospital bed 10. This may enhance the aesthetic appeal of the hospital bed 10, making it more welcoming and comfortable for patients.

In some aspects, the USB charging port 40 is designed to be safe and reliable, with built-in safety features to prevent overcharging or overheating of devices. This may provide peace of mind for patients and healthcare providers alike, ensuring that the USB charging port 40 can be used safely and effectively.

In some cases, the USB charging port 40 is designed to be energy-efficient, consuming a minimum amount of power when not in use. This may contribute to the overall energy efficiency of the hospital, helping to reduce energy costs and environmental impact.

In some aspects, the USB charging port 40 is designed to be easily identifiable, with clear markings or indicators to show its location on the side rail 24. This may make it easier for patients to locate and use the USB charging port 40, enhancing their comfort and convenience.

In some cases, the USB charging port 40 is designed to be easily accessible, with a design that allows patients to plug in and unplug their devices with ease. This may enhance the usability of the hospital bed 10, making it more convenient for patients to charge their devices.

In some aspects, the USB charging port 40 is designed to be resistant to damage from liquids, such as spills or cleaning solutions. This may enhance the durability and longevity of the USB charging port 40, ensuring that it can continue to function effectively even in a hospital setting where spills and cleaning are common occurrences.

In some cases, the USB charging port 40 is designed to be resistant to damage from physical impacts, such as accidental knocks or drops. This may enhance the durability and longevity of the USB charging port 40, ensuring that it can continue to function effectively even in a hospital setting where physical impacts are a potential risk.

In some aspects, the USB charging port 40 is designed to be resistant to damage from electrical surges or fluctuations in power supply. This may enhance the reliability and safety of the USB charging port 40, ensuring that it can continue to function effectively and safely even in a hospital setting where power surges or fluctuations may occur.

In some cases, the USB charging port 40 is designed to be resistant to damage from electromagnetic interference, such as that caused by other electronic devices or equipment in the hospital. This may enhance the reliability and performance of the USB charging port 40, ensuring that it can continue to function effectively even in a hospital setting where electromagnetic interference is a potential risk.

In some aspects, the USB charging port 40 is designed to be resistant to damage from static electricity, such as that caused by friction or dry air. This may enhance the reliability and performance of the USB charging port 40, ensuring that it can continue to function effectively even in a hospital setting where static electricity is a potential risk.

In some cases, the USB charging port 40 is designed to be resistant to damage from corrosion, such as that caused by exposure to moisture or cleaning solutions. This may enhance the durability and longevity of the USB charging port 40, ensuring that it can continue to function effectively even in a hospital setting where exposure to moisture or cleaning solutions is common.

Figure 2:
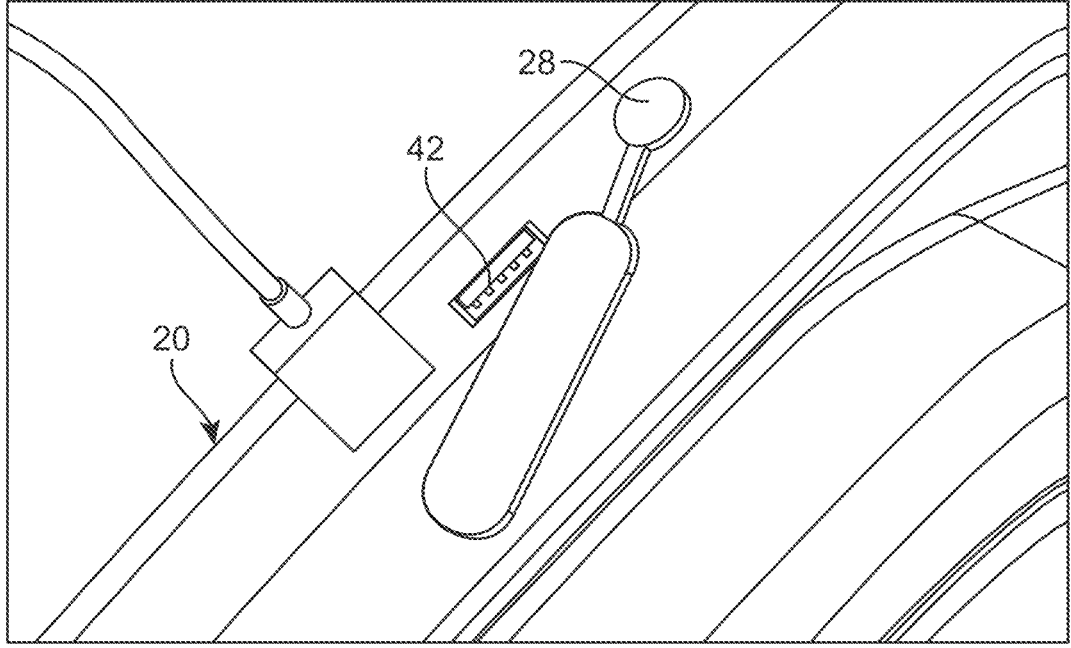
FIG. 2 depicts a detailed view of a hospital bed side rail with an embedded USB charging port, according to an embodiment.
Figure 3:
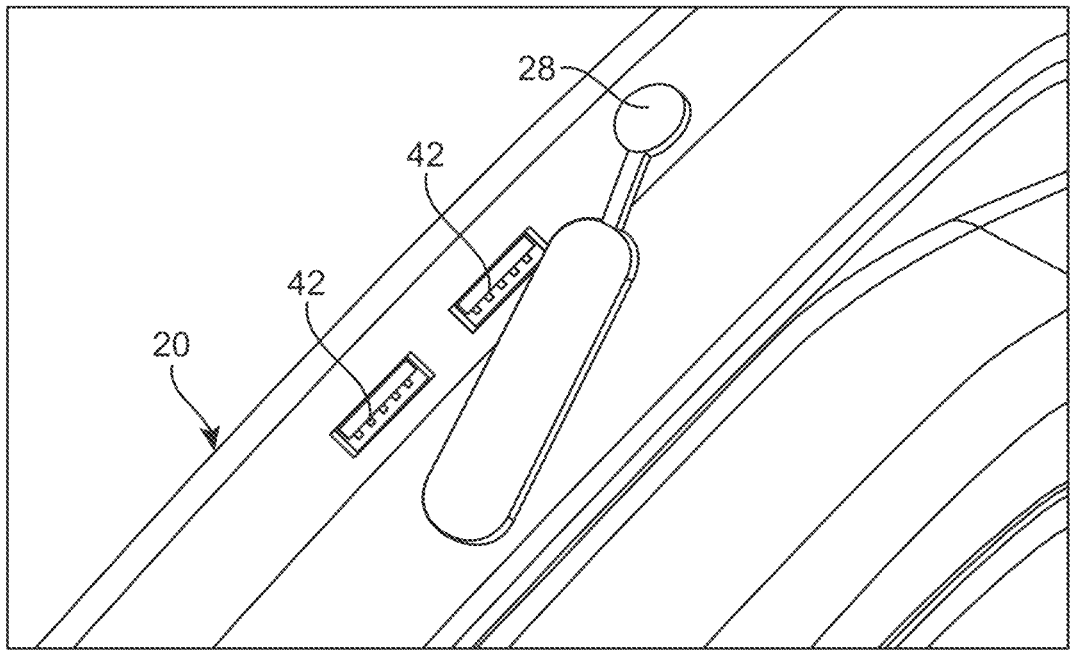
FIG. 3 shows an isometric view of a section of a hospital bed side rail with multiple USB charging ports, in accordance with example embodiments.
Figure 4:
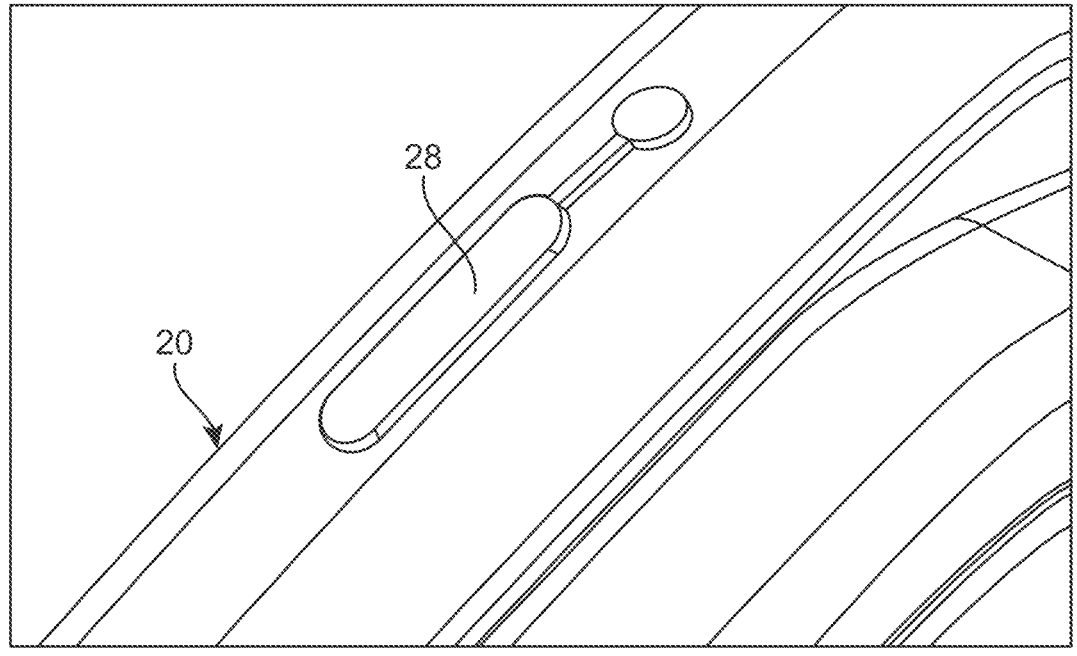
FIG. 4 represents a detailed view of a hospital bed side rail with a removable cover assembly, according to aspects of the present disclosure.

Referring to FIG. 2, an isometric view of a hospital bed side rail 20 integrated with a USB charging port 42 is depicted. In some aspects, a removable cover assembly 28 is pivotally attached to the side rail 20. This cover assembly 28 may be designed to cover the USB charging port 42 when it is not in use, protecting it from dust, debris, and other potential contaminants. The cover assembly 28 may be formed by a circular portion connected to the side rail 20, enabling the cover assembly 28 to pivot.

In some cases, the cover assembly 28 includes an elongated portion designed to span the area where the USB charging ports 42 are located, effectively covering them altogether. This elongated portion may be designed to provide a secure and snug fit over the USB charging ports 42, ensuring that they are fully protected when not in use.

In some aspects, the cover assembly 28 further includes a connecting portion that connects the circular portion and the elongated portion. This connecting portion may be designed to provide structural integrity to the cover assembly 28, ensuring that it remains securely attached to the side rail 20 even during repeated use.

In some cases, the cover assembly 28 is designed to be easily removed and replaced, allowing for easy cleaning and maintenance of the USB charging ports 42. This may enhance the longevity and functionality of the USB charging ports 42, ensuring that they can continue to provide reliable charging for electronic devices over a long period of time.

In some aspects, the cover assembly 28 is designed to be user-friendly, with clear markings or indicators to show how to remove and replace it. This may make it easier for patients or healthcare providers to use the cover assembly 28, enhancing the overall usability of the hospital bed 10.

In some cases, the cover assembly 28 is designed to blend seamlessly with the overall design of the side rail 20, enhancing the aesthetic appeal of the hospital bed 10. This may make the hospital bed 10 more welcoming and comfortable for patients, potentially enhancing their overall experience during their stay in the healthcare facility.

In some aspects, the USB charging port 40 may be designed as a modular element that can be retrofitted into preexisting furniture, offering flexibility and adaptability in various healthcare settings. This modular design allows for the USB charging ports to be added to existing hospital beds or other types of patient support furniture without the need for complete replacement or extensive modifications. The modularity of the USB charging port 40 may provide a cost-effective solution for healthcare facilities looking to upgrade their patient furniture with modern amenities, thereby enhancing the patient experience with added convenience and accessibility.

EXAMPLES

Example 1: Construction of the Hospital Bed with Integrated USB Charging Ports The hospital bed is constructed with an adjustable patient support bed, side rails, and a pair of USB charging ports. The USB charging ports are integrated into one of the side rails and are covered by a removable cover assembly. The cover assembly is designed to be easily removed and replaced, allowing for easy cleaning and maintenance of the USB charging ports. The USB charging ports are designed to be robust and durable, capable of withstanding repeated use over a long period of time. They are also designed to provide a sufficient amount of power to charge a variety of electronic devices, such as smartphones, tablets, and laptops.

Example 2: Functionality of the USB Charging Ports

The USB charging ports are designed to be user-friendly, with clear markings indicating their function and how to use them. They are also designed to be safe and reliable, with built-in safety features to prevent overcharging or overheating of devices. The USB charging ports are energy-efficient, consuming a minimum amount of power when not in use. They are also designed to be resistant to damage from liquids, physical impacts, electrical surges, electromagnetic interference, static electricity, and corrosion.

Example 3: Usage Scenarios of the Hospital Bed with Integrated USB Charging Ports The hospital bed with integrated USB charging ports is particularly beneficial for patients who are unable to move around freely or who wish to keep their devices within easy reach. The integration of USB charging ports into the hospital bed provides patients with continuous access to their electronic devices, potentially reducing boredom and enabling constant communication with their loved ones or healthcare providers. The USB charging ports are easily accessible to the patient lying on the bed, allowing them to charge their electronic devices without having to leave the comfort of the bed.

The foregoing description conveys the best understanding of the objectives and advantages of the present invention. Different embodiments may be made of the inventive concepts of this invention. It is to be understood that all matters disclosed herein is to be interpreted merely as illustrative, and not in a limiting sense.

What is claimed is:

1. A hospital bed, comprising:
   an adjustable patient support structure:
   side rails attached to lateral sides of the adjustable patient support structure; and
   a pair of USB charging ports disposed in one of the side rails, each port having a removable cover assembly, wherein the USB charging ports are configured to allow a patient to charge mobile devices without needing to leave the bed; wherein said removable cover comprises a circular portion that is pivotally attached to the side rail, a connecting portion having a rectangular shape, and a cover portion having an elongated rectangular shape with curved corners, wherein said connecting portion connects the circular portion to the cover portion, wherein said cover portion is placed on top of the pair of USB charging ports to cover them; wherein the cover portion can be removed off the USB charging ports and pivot away therefrom by the circular portion.

2. The hospital bed of claim 1, wherein the USB charging ports are located on the side rail adjacent to the headboard of the bed.

3. The hospital bed of claim 1, wherein the removable cover assembly is designed to protect the USB charging ports from dust and debris when not in use.

4. The hospital bed of claim 3, wherein the USB charging ports provide power to charge a variety of electronic devices including smartphones, tablets, and laptops.

5. The hospital bed of claim 4, wherein the USB charging ports are designed to be resistant to damage from liquids, physical impacts, electrical surges, electromagnetic interference, static electricity, and corrosion.

* * * * *